Aug. 18, 1970   A. J. VOX   3,525,098
PROCESS AND DEVICE FOR HEATING AND/OR COOLING MOULDS
Filed Sept. 20, 1968
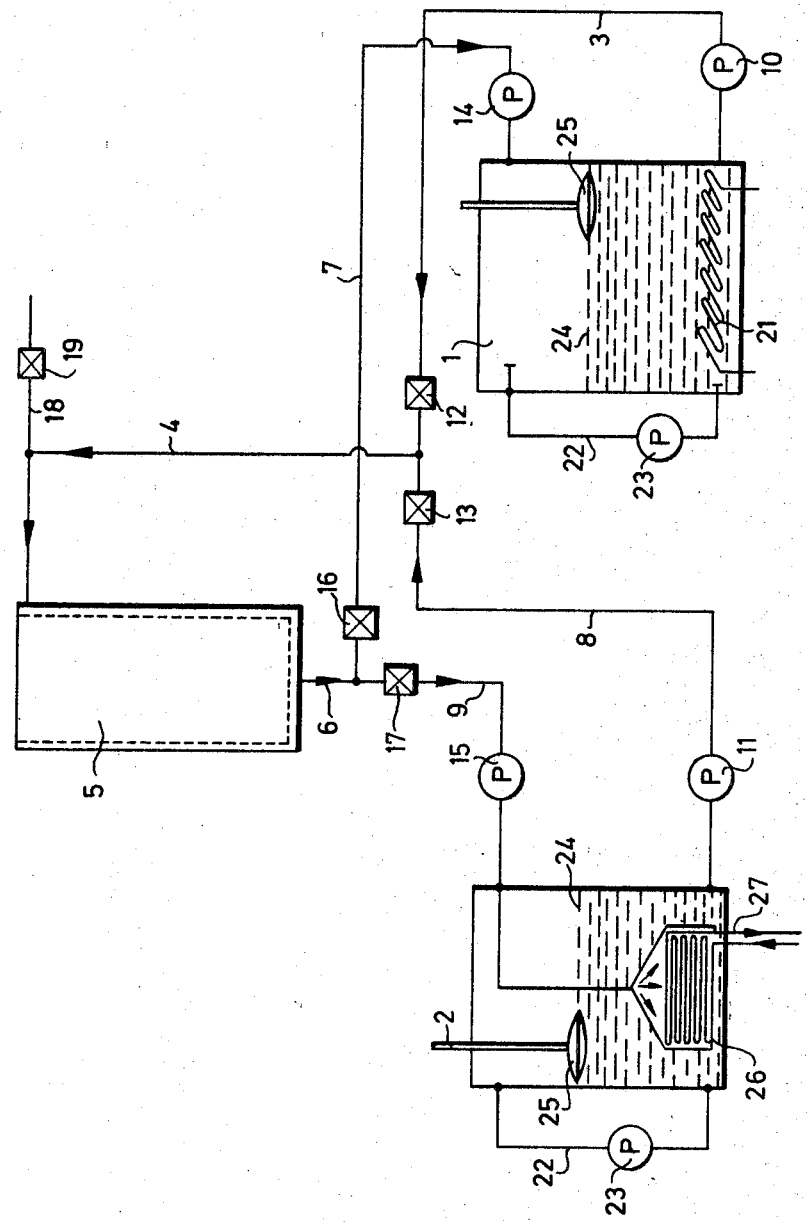
INVENTOR
ANTON J. VOX
BY Michael S. Striker
Attorney 3,525,098
PROCESS AND DEVICE FOR HEATING AND/OR COOLING MOULDS
Anton J. Vox, Ruit, Germany, assignor to Thermovox G.m.b.H. Kunststoffmaschinen, Ruit, Germany
Filed Sept. 20, 1968, Ser. No. 761,222
Int. Cl. F25b 13/00
U.S. Cl. 165—2                    9 Claims

ABSTRACT OF THE DISCLOSURE

A process for heating or cooling moulds for the production of plastic bodies by pumping a heating or a cooling medium respectively through said mould in a circuit, said mould having an interior space having an inlet and an outlet for said medium, comprising the following steps, pumping said medium through said inlet into said interior space with a pumping pressure, and withdrawing said medium at the same time through said outlet with a suction pressure which is at least as high as said pumping pressure applied at said inlet.

---

The invention relates to a process for heating and/or cooling double-walled moulds, particularly rotational moulds, for the production of plastic structures, the heating or cooling medium being pumped, in a circuit, through the wall of the mould. The invention also relates to a device for the performance of the process.

The walls of moulds of this kind are required to be as thin as possible, so that they can be rapidly heated up and also rapidly re-cooled. On the other hand, they must be capable of standing up to the heating or cooling medium pumped through them. This leads to difficulties, particularly with large moulds. Furthermore, the moulds used in the rotational process must be as light in weight and as space-saving as possible. With known moulds the heating or cooling medium is pumped through the mould by pressure, by means of a pressure pump positioned in front of the mould. The known moulds are made comparatively thick, in order to stand up to the pressure occurring in this process. Consequently, it has not hitherto proved possible for large moulds to be heated and cooled in this manner. On the one hand, this would have resulted in excessive weight and size, and on the other hand large moulds heated and cooled by the known method could not have been heated and then re-cooled sufficiently rapidly.

The purpose of the invention is to provide a process of the type mentioned at the beginning and a device for the performance of the process enabling even comparatively large moulds of relatively small weight to be directly heated with satisfactory efficiency, by conveying the heating or cooling medium in a circuit through the double-walled mould. The invention solves this problem, in a process with the characteristics mentioned at the beginning, by a system in which the heating or cooling medium pumped into the wall of the mould is at the same time withdrawn by suction from the outlet, at a somewhat higher suction pressure than the ingoing pump pressure. This enables an excess pressure to be avoided, so that even very large moulds can be constructed with comparatively thin walls and thus satisfactorily heated or cooled. A particularly important factor in this connection is that it is not necessary for channels to be provided for the medium in mould walls intrinsically thick, it being possible for a perhaps very thin walled mould, even if of considerable size, to be surrounded by a likewise thin sheet metal casing thus forming a cavity through which the heating or cooling medium can be conveyed. The invention ensures that the forces exerted on the walls of such a mould remain negligible and therefore do not result in any risk of deformation. The invention makes it possible, owing to the simultaneous introduction of the heating and cooling medium by pumping and its withdrawal by suction, particularly in the case of a heating or cooling liquid, for the latter to be circulated at a considerable speed, so that the temperature drop from the inlet to the outlet of the heating or cooling medium is moderate, as a result of which even very larg moulds can be kept at a constant temperature which can be accurately selected. This is important, inasmuch as it is precisely with large mould that an even degree of heating is frequently a decisive factor in the quality of the plastic bodies thus produced.

Special difficulties arise moreover, in the operation of switching over from heating to cooling and vice versa, since the heating medium and the cooling medium must be mixed together as little as possible. For this purpose, the known apparatus is provided, at the inlet and the outlet of the mould, for the channels guiding the cooling or heating medium through the mould with valves which can be switched over in the required manner so that the entire mould is switched into either a cooling circuit or a heating circuit. In order to ensure that after the operation of changing over, for example, from heating to cooling, the heating medium still present in the channels is not pumped into the cooling circuit, and also that in the operation of switching over from cooling to heating, cooling medium still present in the mould is not pumped into the heating circuit, the outlet valve should be switched over with an appropriate retardation. Even if the outlet valve is controlled in this manner, heating and cooling medium are mixed together in the interior of the mould, because one medium has to be expelled through the other from the mould. In order to simplify the control of the outlet valve, the outlet valve of a known apparatus consists of a valve automatically controlled in accordance with the temperature of the medium flowing out of the mould. The purpose of this process is to ensure that after the inlet of the fluid has been switched over the outlet is not switched over until some other temperature is measured. For example, the cold fluid is required to press the hot fluid out through the mould, in which process the latter fluid is required to flow back into the heating circuit until the cold fluid appears at the outlet itself, the outlet valve being switched over as a result of the temperature change measured so that the cold fluid following up is conveyed into the cooling circuit. This known arrangement, however, likewise fails to provide a satisfactory solution, because cold and hot fluid are mixed together in the mould as before, resulting in considerable heat losses, since up to a certain selected limit temperature mixed fluid, i.e. less warm or less cold fluid, will flow into the relevant circuit. Consequently, until the outlet valve of the heating circuit has been switched over to the cooling circuit, for instance, an appreciable part of the cooling medium mixed with the heating medium, has flowed back into the heating circuit.

The process covered by the invention is considerably improved in this respect if a heating medium and a cooling medium are pumped through the mould wall in alternation, owing to the fact that when the medium is changed the supply of one medium is stopped, the interior of the mould wall is ventilated and this one medium is completely withdrawn from the mould wall by suction, whereupon the ventilation is terminated and the other medium pumped in. This prevents the heating medium and the cooling medium from encountering each other directly. The cooling medium intrdouced into the hollow mould operates solely against a quantity of air which can easily escape, so that no additional pressure is built up by the heating of the cooling medium. Once the entire system has been filled with the cooling medium then the withdrawal of the medium by suction again ensures that no disadvantageous pressures can build up.

Owing to the fact that the invention prevents the heating and cooling medium from being mixed together in any way the advantages of the greatly reduced heat losses or cold losses are invariably supplemented by very rapid heating and also very rapid cooling of the mould to an accurately defined temperature, which is most important for the production of fully satisfactory plastic bodies. The accurately defined temperature is very rapidly reached in this system, because the masses to be heated or to be cooled are kept to a minimum when the additional withdrawal by suction, in accordance with the invention is adopted.

The device provided by the invention for the production of the plastic bodies, with heating and/or cooling, is provided with a double-walled mould particularly a rotational mould, a supply conduit leading into the wall of the mould, at an inlet point, and a return conduit for the heating or cooling medium terminating at an outlet point, and the supply conduit also contains a pressure pump by which the heating or cooling medium is pumped in a circuit. The invention provides that the return conduit of this device is also to contain a suction pump of which the delivery is somewhat greater than that of the pressure pump. In a further development of this device a ventilating valve is provided between the shut-off valve contained in the inlet conduit, on the one hand, and the mould on the other. It can be seen that this device is characterized by extremely simply construction and enables the process covered by the invention to be carried out in a simple manner.

Further details and advantages of the invention will emerge from the following description of a practical embodiment of the device covered by the invention, shown schematically in the drawing.

The device of which the drawing provides a schematic diagram comprises a container 1 for the heating medium and a container 2 for the cooling medium. Both the heating and cooling medium may consist for example, of oil. Here again, however, it would be possible for steam to be used for the heating medium and water as the cooling medium. Examples of possible heating media are salt melts.

From a container 1 for a heating medium a supply conduit 3 connected up in the vicinity of the floor of the container 1 leads to a supply conduit section 4 connected to the upper part of a walled mould 5. A return conduit section 6 leads from the floor of the container 5 and is continued in the form of a return conduit 7 leading to the upper part of the container 1. To the supply conduit section 4 associated with the mould 5 is also connected a supply conduit 8 leading from a container 2 for the cooling medium, this latter conduit likewise being connected up in the vicinity of the floor of the container 2, while the return conduit section 6 leading from the mould 5 is prolonged not only by the return conduit 7 but also by a return conduit 9 leading to the container 2. The supply conduits 3 and 8 contain pressure pumps 10 and 11 in the vicinity of the containers 1 and 2 respectively, each pump serving to withdraw the medium from the relevant container by suction and press it into the mould 5. To prevent a medium from moving from one container into another, non-return valves 12 and 13 are provided in the vicinity of the point at which the supply conduits 3 and 8 are connected to the common supply conduit section 4 associated with the mould 5, the said valves ensuring that in each case the medium can only pass from the container to the mould in one way. Similarly, the return conduits 7 and 9, associated with the containers 1 and 2, contains pumps 14 and 15 in the vicinity of the containers, these pumps withdrawing the medium from the mould 5 by suction and conveying it into the container 1 or 2 as the case may be. Furthermore, the return conduits 7 and 9 also contain non-return valves 16 and 17, only allowing flow of the medium from the mould back into the container and preventing media from overflowing from one container into the other. To the common supply conduit section 4 associated with the mould 5 is also connected a tap line 18 with a ventilating valve 19, which is normally closed and which is only opened when necessary.

In order to heat the mould 5, the two pumps 10 and 14 are for example switched in by the aid of a suitable control device, which may comprise a timing mechanism, so that the heating medium kept at a certain temperature at the container 1 is forced by the pump 10, via the conduits 3 and 4, into the hollow double-wall of the mould 5, and is withdrawn from the mould 5 by the pump 14, via the conduit 6 and 7 and conveyed back into the container 1. The withdrawal of the heating medium from the mould 5 by suction ensures that no excess pressure builds up in the hollow space formed by the double walls of the mould. The non-return valve 13 prevents heating medium from being forced in the direction of the container 2 for the cooling medium. Similarly, the non-return valve 17 prevents cooling medium from being sucked out of the container 2 by the pump 14.

If, after the elapse of a certain period, the mould is to be cooled instead of being heated, then the pump 10 is first of all shut-off, the movement of heating medium in the direction of the mould 5 thus being terminated. The ventilating valve 19, which may consist, for example of a magnetic valve is open. It is consequently possible for the whole of the heating medium to be withdrawn from the mould 5 by the suction pump 14. After a certain period which is definitely sufficient to remove the whole of the heating medium from the pump 5 the ventilating valve 19 is then reclosed, th suction pump 14 is shut-off and the pumps 11 and 15 are started up, these pumps now conveying the cooling medium from the container 2 via the conduits 8 and 4 into the mould 5 and returning it by suction from the mould 5, via the conduits 6 and 9 to the container 2. After the termination of the cooling period the initial operation is again merely that of shutting off the pressure pump 11 and opening the ventilating valve 19, so that the suction pump 15 can evacuate the mould 5. During the cooling period the non-return valve 12 prevents cooling medium from being forced into the container 1 and the non-return valve 16 prevents heating medium from being withdrawn from the container 1 by suction.

The invention ensures that when changing over from the heating period to the cooling period or vice versa the two media do not come into contact with each other. It also prevents any appreciable pressure fluctuations from occurring when changing the medium, since the latter operates against an "air cushion" which can easily drive the medium in front of it and prevents any appreciable pressure from occurring.

An even temperature for the mould during the heating period and also during the cooling period is best ensured by the fact that the heating medium and also the cooling medium are kept at a certain desired constant temperature in the containers 1 and 2 respectively. For this purpose the container 1 is provided with an electrical heating coil 21 which offers the special advantage that the supply of energy can be controlled with particular ease. It goes without saying, that this can also be replaced by heating coils for steam heating or the like, or that the container can be heated by oil or gas. In order to ensure temperature compensation within the container a by-pass conduit 22 with a circulating pump 23 is provided, which takes up the heating medium by suction, in the vicinity of the base container 1, conveying back to the container above the level 24 of the liquid. The level of the liquid in the container 1 is monitored by a float 25. Furthermore, the return conduit 7 leads into the container 1 at a point above the level 24 of the liquid, thus ensuring effective de-aeration of the heating medium.

The container 2 is mainly constructed on the same lines as the container 1 and is likewise provided with the by-pass conduit 22 with a pump 23 for the circulation of the cooling medium and with the float 25 for monitoring the level of the cooling medium. In order to dissipate the heat taken up by the cooling medium use is made in this case of a cooler 26 to which a cooling medium is conveyed via conduits 27 and which is situated underneath the level 24 of the liquid, in order to avoid the formation of condensation water. To ensure effective cooling the cooling medium conveyed back via the return conduit 9 is conveyed as far as the cooler 26, through which it is forced to pass. This causes the cooling medium to flow past the cooling coil 26, which is particularly favourable from the point of view of heat exchange.

Needless to say, the invention is not confined to the example described, deviations being possible without departing from the scope of the invention. Such deviations may result, in particular, from the adaptation of the invention to various purposes. It is naturally not only with rotational machines that the invention can be applied, although it is these that make its advantages particularly evident, and it can be used wherever moulds are to be alternately heated and cooled with a high degree of efficiency and without being made particularly pressure proof. The problem of heating and cooling the mould also arises, for example, in injection moulding machines for moulded bodies of large volume, so that with such moulds likewise the invention can be advantageously applied.

I claim:

1. A method of heating or cooling moulds for the production of plastic bodies by pumping a heating or a cooling medium through a space defined at least in part between thin double walls of the mould which are liable to be deformed by a critical amount of pressure of said pumped-through heating or cooling medium, said method comprising the steps of pumping said medium with a predetermined pressure at a first point into said space and simultaneously withdrawing said medium at a second point spaced from said first point from said space with a suction pressure which is at least as high as said predetermined pressure so as to maintain in said space a pressure not exceeding said critical amount of pressure.

2. A method as defined in claim 1, wherein said suction pressure is higher than said pumping pressure.

3. A method for heating and cooling a mould for the production of plastic bodies by pumping a heating and a cooling medium in alternation through an interior space of said mould which is provided with an inlet and an outlet, said method comprising the steps of stopping the supply of one medium; ventilating said interior space and removing said one medium therefrom by suction during said ventilation; stopping said ventilation; and pumping said other medium into said space.

4. An apparatus for the production of plastic bodies comprising at least one mould having thin double walls defining between themselves a space for the passage of a heating or cooling medium therethrough, said space having an inlet and an outlet spaced from said inlet; a pressure pump connected to said inlet for pumping a heating or a cooling medium into said space; and a suction pump connected to said outlet for sucking said medium from said space simultaneously with the pumping of said medium into said space by said pressure pump, the delivery of said suction pump being at least as high as the delivery of said pressure pump so that build up of pressure in said space which would lead to a deformation of said thin walls is avoided.

5. An apparatus as defined in claim 4, wherein the delivery of said suction pump is slightly higher than that of said pressure pump.

6. A device for the production of plastic bodies comprising at least one mould for forming said plastic bodies, said mould having an interior space through which a heating and a cooling medium can be pumped in alternation, said interior space having an inlet and an outlet for said media, a supply conduit for said media terminating at said inlet; a return conduit for said media terminating at said outlet; first means including pressure pump means connected to said supply conduit for pumping said media in alternation through said interior space of said mould; second means including suction pump means connected to said return conduit; and a ventilating valve in said supply conduit between said pressure pump and said inlet.

7. An apparatus as defined in claim 4, and including a first container adapted to contain a cooling medium, a second container adapted to contain a heating medium, an inlet conduit connected at one end to said inlet and having an opposite end, a pair of supply conduits each communicating at one end thereof with said opposite end of said inlet conduit and at the other end respectively with said first and said second container in the region of the bottom of the respective container, one of said pressure pumps in each of said supply conduits, a one-way valve in each of said supply conduits between the respective pressure pump and said opposite end of said inlet conduit for permitting flow of the medium from the respective continer into said space while preventing flow of the medium from one into the other container, a discharge conduit connected at one end to said outlet and having an opposite end, a pair of return conduits, each connected at one end to said opposite end of said discharge conduit and at the other end thereof to the respective container, one of said suction pumps in each of said return conduits, and a valve in each of said return conduits between said oposite end of said discharge conduit and the respective suction pump.

8. An apparatus as defined in claim 7, and including a ventilating valve in said inlet conduit and a control device with a timing mechanism which after a certain heating period, when said pressure pump and said suction pump of said heating circuit are switched on and convey said heating medium through said space of said mould, shuts off said pressure pump of said heating circuit and opens said ventilating valve, but allows said suction pump of said heating circuit to continue to operate till at least said space is freed of said heating medium, and which then shuts off said suction pump of said heating circuit, closes said ventilating valve and then turns on said pressure pump and said suction pump of said cooling circuit, until after the expiration of a certain cooling period said presure pump and said suction pump of said cooling circuit are shut off in the same sequence and said ventilating valve is opened and closed after the expiration of said heating period.

9. An apparatus as defined in claim 7, and including cooling means in said first container and heating means in said second container for respectively cooling and heating the medium therein.

References Cited

UNITED STATES PATENTS

| | | | |
|---|---|---|---|
| 3,041,046 | 6/1962 | Nellis et al. | 165—66 |
| 3,109,486 | 1/1963 | Hansen | 165—22 |
| 3,259,175 | 7/1966 | Kraus et al. | 165—12 |

ROBERT O. O'LEARY, Primary Examiner
C. SUKALO, Assistant Examiner

U.S. Cl. X.R.
165—12, 26, 48